(12) United States Patent
Cho et al.

(10) Patent No.: US 12,482,250 B2
(45) Date of Patent: Nov. 25, 2025

(54) APPARATUS AND METHOD FOR MOTION RECOGNITION BASED ON PULSE RADAR

(71) Applicant: DAEGU GYEONGBUK INSTITUTE OF SCIENCE AND TECHNOLOGY, Daegu (KR)

(72) Inventors: Hui Sup Cho, Daegu (KR); Young Jin Park, Daegu (KR)

(73) Assignee: DAEGU GYEONGBUK INSTITUTE OF SCIENCE AND TECHNOLOGY, Daegu (KR)

( * ) Notice: Subject to any disclaimer, the term of this patent is extended or adjusted under 35 U.S.C. 154(b) by 342 days.

(21) Appl. No.: 18/030,347

(22) PCT Filed: Sep. 7, 2021

(86) PCT No.: PCT/KR2021/012155
§ 371 (c)(1),
(2) Date: Apr. 5, 2023

(87) PCT Pub. No.: WO2022/097894
PCT Pub. Date: May 12, 2022

(65) Prior Publication Data
US 2023/0377167 A1 Nov. 23, 2023

(30) Foreign Application Priority Data
Nov. 3, 2020 (KR) .................. 10-2020-0145405

(51) Int. Cl.
*G06V 10/82* (2022.01)
*G01S 7/06* (2006.01)
(Continued)

(52) U.S. Cl.
CPC .............. *G06V 10/82* (2022.01); *G01S 7/062* (2013.01); *G01S 7/415* (2013.01); *G01S 13/89* (2013.01);
(Continued)

(58) Field of Classification Search
CPC .... G06T 7/20; G06T 5/00; G06T 5/50; G06T 2207/10024; G06T 2207/10028;
(Continued)

(56) References Cited

U.S. PATENT DOCUMENTS 11,435,443 B2 * 9/2022 Santra ................ G01S 13/72
2018/0157916 A1 * 6/2018 Doumbouya ........ G06V 40/103
(Continued)

FOREIGN PATENT DOCUMENTS

EP 3716020 9/2020
KR 10-1883228 7/2018
(Continued)

OTHER PUBLICATIONS

Fogle, O. Ryan, et al. "Micro-range/micro-Doppler decomposition of human radar signatures." IEEE Transactions on Aerospace and Electronic Systems 48.4 (Oct. 8, 2012):3058-3072 (Year: 2011).*
(Continued)

*Primary Examiner* — Vladimir Magloire
*Assistant Examiner* — Naomi M Wolford
(74) *Attorney, Agent, or Firm* — LEX IP MEISTER, PLLC

(57) ABSTRACT

A motion recognition method may include receiving a plurality of frame signals based on radar pulses reflected from a target at different times, generating a plurality of micro-range enhanced frame signals obtained by reinforcing a component of a second region having more movement than movement of a first region among the plurality of frame signals, generating a micro-range enhanced frame set formed by stacking the plurality of micro-range enhanced frame signals at preset time intervals, generating a micro-range enhanced radar image which is an image obtained by viewing the micro-range enhanced frame set in a direction perpendicular to a time axis of the micro-range enhanced (Continued)

(a)

(b)

frame set, and determining motion of the target by inputting the micro-range enhanced radar image to a machine learning-based learning model.

19 Claims, 9 Drawing Sheets

(51) Int. Cl.
*G01S 7/41* (2006.01)
*G01S 13/89* (2006.01)
*G06T 5/50* (2006.01)
*G06T 7/20* (2017.01)

(52) U.S. Cl.
CPC .................. *G06T 5/50* (2013.01); *G06T 7/20* (2013.01); *G01S 7/417* (2013.01); *G06T 2207/10024* (2013.01); *G06T 2207/10028* (2013.01); *G06T 2207/20081* (2013.01); *G06T 2207/20084* (2013.01); *G06T 2207/20212* (2013.01); *G06T 2207/30196* (2013.01)

(58) Field of Classification Search
CPC . G06T 2207/20081; G06T 2207/20084; G06T 2207/20212; G06T 2207/30196; G01S 7/062; G01S 7/415; G01S 13/89; G01S 7/417; G01S 13/0209; G01S 13/588; G01S 7/003; G01S 7/2923; G01S 7/292; G01S 7/41; G06V 10/778; G06V 10/82; G06V 40/20; G06N 20/00
See application file for complete search history.

(56) References Cited

U.S. PATENT DOCUMENTS

2019/0227156 A1* 7/2019 Santra .................... G01S 13/42
2021/0240274 A1   8/2021 Schmalenberg et al.

FOREIGN PATENT DOCUMENTS

| KR | 10-1988182 | 6/2019 |
| KR | 10-2019-0091132 | 8/2019 |
| KR | 10-2021531 | 11/2019 |
| KR | 10-2020-0086935 | 7/2020 |

OTHER PUBLICATIONS

Fogle, O. Ryan, et al. "Micro-range/micro-Doppler decomposition of human radar signatures." IEEE Transactions on Aerospace and Electronic Systems 48.4 (Oct. 8, 2012): 3058-3072.

* cited by examiner

APPARATUS AND METHOD FOR MOTION RECOGNITION BASED ON PULSE RADAR

TECHNICAL FIELD

The present disclosure relates to an apparatus and method for motion recognition based on pulse radar.

Background Art

There is technology for recognizing human motion using a conventional radar device. Among motion recognition technologies using a conventional radar device, micro-Doppler technology recognizes motion based on a feature in which a Doppler value generated from an arm, a leg, a torso, a head, etc. changes according to human motion.

However, CW (Continuous Wave) radar-based motion recognition technology including the micro-Doppler technology has a limitation in that it is impossible to measure a distance to a target.

To describe in detail, the CW radar-based motion recognition technology does not utilize information about a change in distance to radar occurring when a specific body part of a person moves, takes only a Doppler shift (Doppler shift frequency) due to a change in speed of a moving body part of the person as an observation target, and recognizes motion of the person based on a change in Doppler shift over time. Motion recognition based on Doppler shift change, which is the foundation of the CW radar-based motion recognition technology, is equivalent to assuming that all targets exist in one and the same plane, where spaces of different distances in front of the radar are located at a constant distance from an antenna, and all movements of the target are made in one and the same plane.

In other words, despite the fact that human motion actually occurs while a distance from the radar changes in a 3D space (even when a part of the body is moved, a distance between the part of the body and the radar changes), the CW radar-based motion recognition technology has a technical limitation in recognizing motion based on Doppler shift assuming that various motions of the human body occur in one plane.

Therefore, there is a need for technology capable of accurately recognizing human motion by additionally reflecting information about a change in distance due to the human motion.

DISCLOSURE

Technical Problem

Therefore, the present disclosure has been made in view of the above problems, and it is an object of the present disclosure to provide an apparatus and method for recognizing motion of a target based on a pulse radar signal.

It is another object of the present disclosure to provide an apparatus and method for reinforcing a micro-range signal generated from various motions of a target in a pulse radar signal reflected from the target.

It is a further object of the present disclosure to provide an apparatus and method for reinforcing a micro-range signal generated from various motions of a target by imaging a pulse radar signal reflected from the target.

It is a further object of the present disclosure to provide an apparatus and method for imaging a pulse radar signal reflected from a target and recognizing various motions of the target based on a machine learning-based learning model.

Technical Solution

An embodiment of the present disclosure provides an apparatus and method for recognizing motion of a target based on a pulse radar signal reflected from the target.

Another embodiment of the present disclosure provides an apparatus and method for reinforcing a micro-range signal generated from various motions of a target in a pulse radar signal reflected from the target.

Still another embodiment of the present disclosure provides an apparatus and method for reinforcing a micro-range signal generated from various motions of a target by imaging a pulse radar signal reflected from the target.

In accordance with an aspect of the present disclosure, the above and other objects can be accomplished by the provision of a method of operating a motion recognition apparatus, the method including receiving a plurality of frame signals based on radar pulses reflected from a target at different times, generating a plurality of micro-range enhanced frame signals obtained by reinforcing a component of a second region having more movement than movement of a first region among the plurality of frame signals, and generating a micro-range enhanced frame set formed by stacking the plurality of micro-range enhanced frame signals at preset time intervals, generating a micro-range enhanced radar image which is an image obtained by viewing the micro-range enhanced frame set in a direction perpendicular to a time axis of the micro-range enhanced frame set, and determining motion of the target by inputting the micro-range enhanced radar image to a machine learning-based learning model.

In accordance with another aspect of the present disclosure, there is provided a method of operating a motion recognition apparatus, the method including receiving a radar image which is an image obtained by viewing a frame set formed by stacking, at preset time intervals, a plurality of frame signals based on radar pulses reflected from a target at different times, in a direction perpendicular to a time axis, determining a micro-range in which a change in distance between at least a part of the target and a reception antenna is reflected due to movement of the part in the radar image, generating a micro-range enhanced radar image obtained by reinforcing components of the micro-range in the radar image, and determining motion of the target by inputting the micro-range enhanced radar image to a machine learning-based learning model.

In accordance with a further aspect of the present disclosure, there is provided a motion recognition apparatus including at least one processor, and a memory electrically connected to the processor and configured to store at least one piece of code executed by the processor, wherein the memory stores code that causes the processor to receive a plurality of frame signals based on radar pulses reflected from a target at different times, generate a plurality of micro-range enhanced frame signals obtained by reinforcing a component of a second region having more movement than movement of a first region among the plurality of frame signals, generate a micro-range enhanced frame set formed by stacking the plurality of micro-range enhanced frame signals at preset time intervals, generate a micro-range enhanced radar image which is an image obtained by viewing the micro-range enhanced frame set in a direction perpendicular to a time axis of the micro-range enhanced frame set, and determine motion of the target by inputting the micro-range enhanced radar image to a machine learning-based learning model when executed through the processor.

In accordance with a further aspect of the present disclosure, there is provided a memory of a motion recognition apparatus configured to store code that causes a processor to receive a plurality of frame signals based on radar pulses reflected from a target at different times, generate a frame set formed by stacking a plurality of frame signals at preset time intervals, determine a micro-range within which a change in distance between at least a part of the target and a reception antenna is reflected due to movement of the part in the frame set, generate a micro-range enhanced frame set obtained by reinforcing a component of a micro-range in the frame set, generate a micro-range enhanced radar image which is an image obtained by viewing the micro-range enhanced frame set in a direction perpendicular to a time axis of the micro-range enhanced frame set, and determine motion of the target by inputting the micro-range enhanced radar image to a machine learning-based learning model when executed through the processor.

In accordance with a further aspect of the present disclosure, there is provided a memory of a motion recognition apparatus configured to store code that causes a processor to receive a radar image which is an image obtained by viewing a micro-range enhanced frame set formed by stacking a plurality of frame signals based on radar pulses reflected from a target at different times in a direction perpendicular to a time axis of the micro-range enhanced frame set, determine a micro-range within which a change in distance between at least a part of the target and a reception antenna is reflected due to movement of the part in the radar image, generate a micro-range enhanced radar image obtained by reinforcing a component of a micro-range, and determine motion of the target by inputting the micro-range enhanced radar image to a machine learning-based learning model when executed through the processor.

In accordance with a further aspect of the present disclosure, there is provided a memory of a motion recognition apparatus configured to store code that causes a processor to receive a radar image which is an image obtained by viewing a micro-range enhanced frame set formed by stacking a plurality of frame signals based on radar pulses reflected from a target at different times in a direction perpendicular to a time axis of the micro-range enhanced frame set, determine a second region in which a change in a pixel value between columns is larger than a change in a pixel value between columns in a first region in the radar image, generate a micro-range enhanced radar image obtained by reinforcing a component of the second region ion the radar image, and determine motion of the target by inputting the micro-range enhanced radar image to a machine learning-based learning model when executed through the processor.

Advantageous Effects

A motion recognition apparatus and a motion recognition method according to an embodiment of the present disclosure may recognize motion of a target based on a pulse radar signal.

Another embodiment of the present disclosure may accurately determine various motions of a target based on a change in a distance signal of a pulse radar reception device from a component of the target.

Still another embodiment of the present disclosure may accurately determine various motions of a target by reinforcing a region in which the target moves a lot in a radar signal based on the amount of motion of the target.

Yet another embodiment of the present disclosure may accurately determine various motions of a target by converting a radar signal into an image and applying a machine learning-based learning model, and may retrain and use a previously trained learning model.

BEST MODE

Hereinafter, embodiments disclosed in the present disclosure will be described in detail with reference to the accompanying drawings, and the same or similar elements will be given the same reference numerals regardless of reference symbols, and redundant description thereof will be omitted. In the following description, the terms "module" and "unit" for referring to elements are assigned and used interchangeably in consideration of convenience of explanation, and thus, the terms per se do not necessarily have different meanings or functions. Further, in describing the embodiments disclosed in the present specification, when it is determined that a detailed description of related publicly known technology may obscure the gist of the embodiments disclosed in the present specification, the detailed description thereof will be omitted. In addition, the accompanying drawings are only for easy understanding of the embodiments disclosed in this specification, the technical idea disclosed in this specification is not limited by the accompanying drawings, and it should be understood to embrace all modifications, equivalents, and substitutes included in the spirit and scope of the present invention.

Although terms including ordinal numbers, such as "first", "second", etc., may be used herein to describe various elements, the elements are not limited by these terms. These terms are generally only used to distinguish one element from another.

When an element is referred to as being "coupled" or "connected" to another element, the element may be directly coupled or connected to the other element. However, it should be understood that another element may be present therebetween. In contrast, when an element is referred to as being "directly coupled" or "directly connected" to another element, it should be understood that there are no other elements therebetween.

An environment for performing a motion recognition method or operating a motion recognition apparatus according to an embodiment of the present disclosure will be described with reference to FIG. 1.

Figure 1:
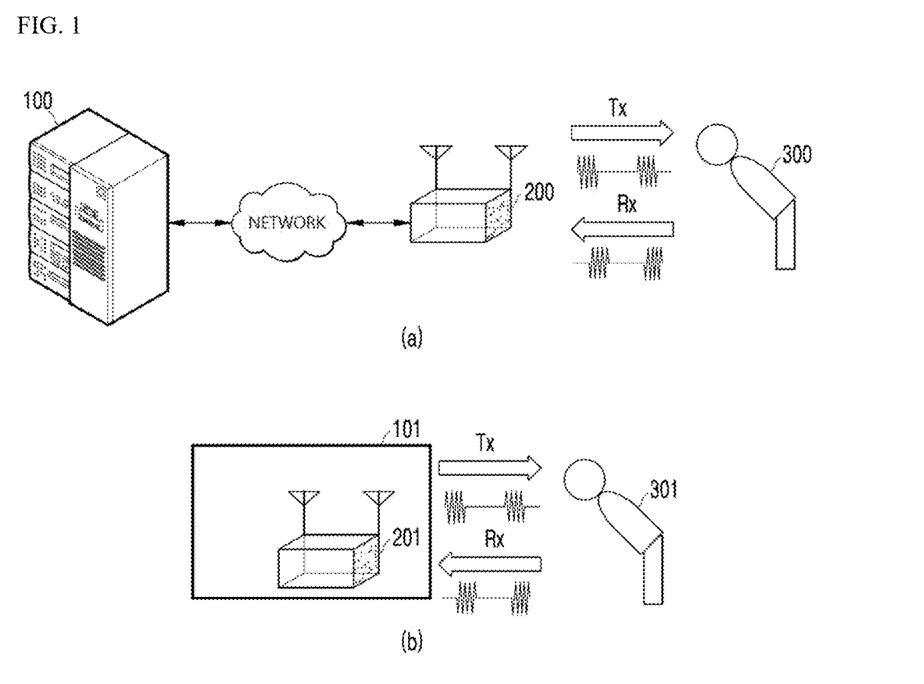
FIG. 1 is a diagram illustrating an environment for performing a motion recognition method or operating a motion recognition apparatus according to an embodiment of the present disclosure.

Referring to FIG. 1(a), the environment for performing the motion recognition method or operating the motion recognition apparatus according to the embodiment of the present disclosure may include a motion recognition apparatus 100 and a radar device 200.

The radar device 200 may transmit a pulse radar signal to a target 300 and receive a pulse radar signal reflected from the target 300. The pulse radar signal may be an ultra-wideband (UWB) pulse radar signal.

Figure 6:
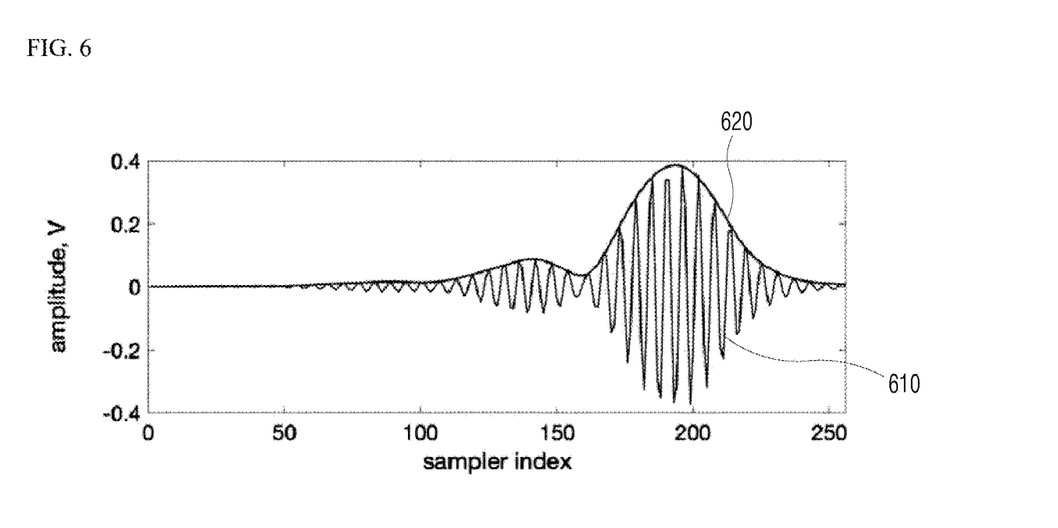
FIG. 6 is a diagram for describing a frame set and a radar image according to an embodiment of the present disclosure.

The received pulse radar signal may be a signal 610 of FIG. 6, strength of which changes, and may be commonly referred to as a frame signal or a sub-pulse signal. The frame signal refers to signals received at regular time intervals by reflecting pulse radar signals transmitted at regular time intervals (signals obtained by separating the reflected signal at regular time intervals). A Y-axis of the frame signal illustrated in FIG. 6 may be an amplitude value indicating signal strength, and an X-axis may be an index value related to a distance to a target.

The motion recognition apparatus 100 may receive a plurality of frame signals from the radar device 200, and generate a micro-range enhanced frame set obtained by enhancing a component of a micro-range having small amplitude reflected from a component of a target, such as an arm or a head in the case of a person, from each component of the plurality of frame signals.

In this specification, a signal set formed by stacking frame signals at preset time intervals is referred to as a frame set.

The motion recognition apparatus 100 may receive a frame signal from the radar device 200 through a wired or wireless network, or may receive a frame signal through a serial or parallel connection between devices.

The motion recognition apparatus 100 may generate a micro-range enhanced radar image obtained by imaging a micro-range enhanced frame set, in which a micro-range component is enhanced, based thereon, input the micro-range enhanced radar image to a machine learning-based learning model, and determine motion of the target 300.

Referring to FIG. 1(*b*), the environment for performing the motion recognition method or operating the motion recognition apparatus according to the embodiment of the present disclosure may be implemented as a motion recognition apparatus 101 including a radar module 201. The motion recognition apparatus 101 may operate the radar module 201 to transmit a pulse radar signal to a target 301, store a radar signal reflected from the target 301 as a frame signal, generate a micro-range enhanced frame set in which a micro-range component is enhanced based on the frame signal, input a micro-range enhanced radar image obtained by imaging the micro-range enhanced frame set to a learning-based learning model, and determine motion of the target 301.

For convenience, the following description will be given according to an embodiment in which the motion recognition apparatus 100 and the radar device 200 are separately implemented. However, a person skilled in the art may know that the present invention may be implemented using a motion recognition apparatus including a radar module.

A configuration of the motion recognition apparatus according to an embodiment of the present disclosure will be described with reference to FIG. 2.

When the radar device 200 is separately implemented, the motion recognition apparatus may include a communication unit 110 for receiving a frame signal from the radar device 200.

The communication unit 110 may include a communication module 111 for transmitting and receiving data with an external device, and the communication module 111 may include at least one of a mobile communication module, a wireless Internet module, a short-range communication module, or a location information module.

The mobile communication module transmits and receives a radio signal with at least one of a base station, an external terminal, or a server on a mobile communication network constructed according to technical standards or communication methods for mobile communication (for example, GSM (Global System for Mobile communication), CDMA (Code Division Multi Access), CDMA 2000 (Code Division Multiple Access 2000), EV-DO (Enhanced Voice-Data Optimized or Enhanced Voice-Data Only), WCDMA (Wideband CDMA), HSDPA (High Speed Downlink Packet Access), HSUPA (High Speed Uplink Packet Access), LTE (Long Term Evolution), LTE-A (Long Term Evolution-Advanced), etc.).

The wireless Internet module refers to a module for wireless Internet access, and may be built into or externally provided to the motion recognition apparatus 100. The wireless Internet module is configured to transmit and receive a radio signal in a communication network based on wireless Internet technologies.

Examples of the wireless Internet technologies may include WLAN (Wireless LAN), Wi-Fi, Wi-Fi Direct, DLNA (Digital Living Network Alliance), WiBro (Wireless Broadband), WiMAX (World Interoperability for Microwave Access), HSDPA (High Speed Downlink Packet Access), HSUPA (High Speed Uplink Packet Access), LTE (Long Term Evolution), LTE-A (Long Term Evolution-Advanced), etc.

The short-range communication module is for short-range communication, and may support short-range communication using at least one of Bluetooth™, RFID (Radio Frequency Identification), infrared communication (Infrared Data Association; IrDA), UWB, ZigBee, NFC, Wi-Fi, Wi-Fi Direct, or Wireless USB (Wireless Universal Serial Bus) technology.

The motion recognition apparatus may be implemented in the form of a server device or may be implemented in the form including a processor and a memory such as a laptop computer, a personal computer, a tablet computer, etc., and is not particularly limited as long as the motion recognition apparatus is a computing device capable of processing signals by operating the processor.

The motion recognition apparatus 100 may include an interface unit 120 for displaying a data processing process or a motion recognition result to a user, receiving input from the user, or allowing the user to perform a control operation. The interface unit 120 may include a touch or mechanical button 121, a display 122, an LED capable of outputting light, or a speaker 123 capable of outputting audio.

As described with reference to FIG. 1, the motion recognition apparatus 100 may be implemented by including a radar unit 140 that transmits or receives a radar signal, may include at least one antenna 142 for transmitting (Tx) or receiving (Rx) the radar signal in this case, and may include components such as an amplifier and a mixer for transmitting a radar signal and a pulse radar processing unit 141 for processing a received radar signal. Since a hardware or software configuration for transmitting or receiving a radar signal is known to a person skilled in the art, a detailed description thereof will be omitted.

The motion recognition apparatus 100 may include a memory 130 for storing intermediate data such as a received frame signal, a frame set, a micro-range enhanced frame set, and a micro-range enhanced radar image, or storing a machine learning-based trained learning model capable of recognizing motion by being applied to a micro-range enhanced radar image.

Figure 2:
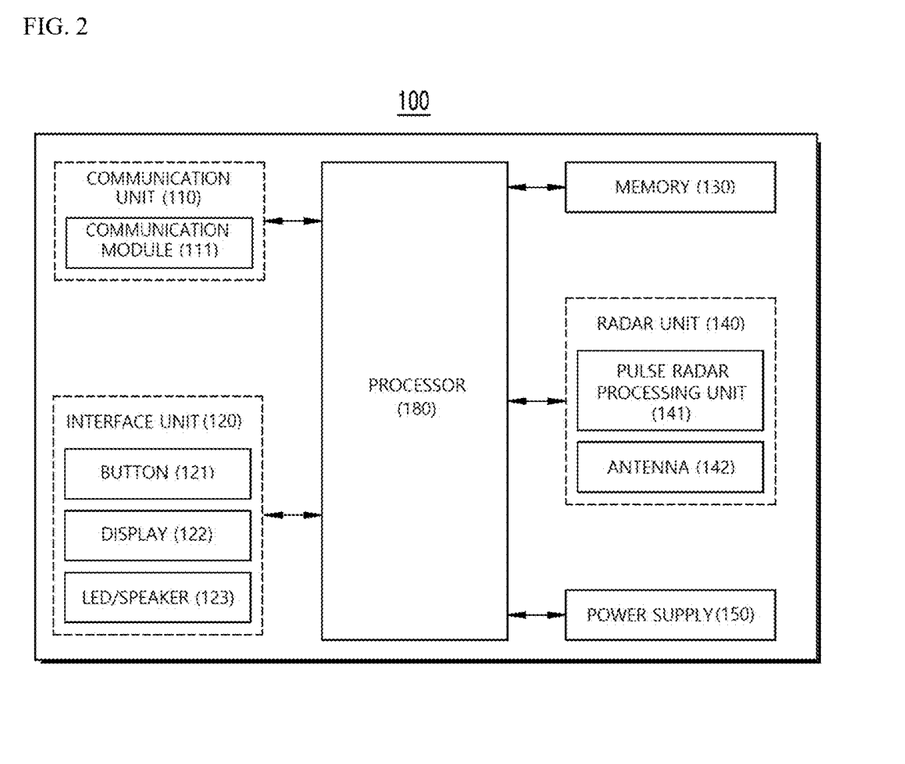
FIG. 2 is a block diagram illustrating a configuration of the motion recognition apparatus according to an embodiment of the present disclosure.

Although not illustrated in FIG. 2, the motion recognition apparatus 100 may include at least one of a wired/wireless data port, a memory card port, a port connecting a device having an identification module, an audio input/output (I/O) port, a video I/O port, or an earphone port as a separate interface that serves as a passage with various types of external devices.

In an embodiment, the motion recognition apparatus 100 may generate a plurality of micro-range enhanced frame signals obtained by enhancing a component of a region in which a target moves a lot based on a plurality of frame signals received from the radar device 200, generate a micro-range enhanced radar image which is an image obtained by viewing a micro-range enhanced frame set formed by stacking the plurality of micro-range enhanced frame signals at preset time intervals in a direction perpendicular to a time axis, and determine motion of the target by inputting the micro-range enhanced radar image to a machine learning-based learning model.

In another embodiment, the motion recognition apparatus 100 may receive radar frame signals from a separate device, stack the radar frame signals at preset time intervals to generate a frame set, and view the frame set in the direction perpendicular to the time axis to generate a radar image, or receive input of a radar image obtained by viewing a frame set in the direction perpendicular to the time axis from a separate device, thereby generating a micro-range enhanced radar image obtained by enhancing a micro-range component in which a change in distance between at least a part of the target and a reception antenna is reflected due to movement of the part, and determine motion of the target by inputting the micro-range enhanced radar image to a machine learning-based learning model.

That is, the motion recognition apparatus 100 may reinforce a component of a region (micro-range) in which the target moves a lot based on a frame signal or a radar image generated based on the frame signal, reduce a component of a region (macro-range) in which the target moves less, and determine motion of the target by inputting a micro-range enhanced radar image to a learning model.

Figure 3:
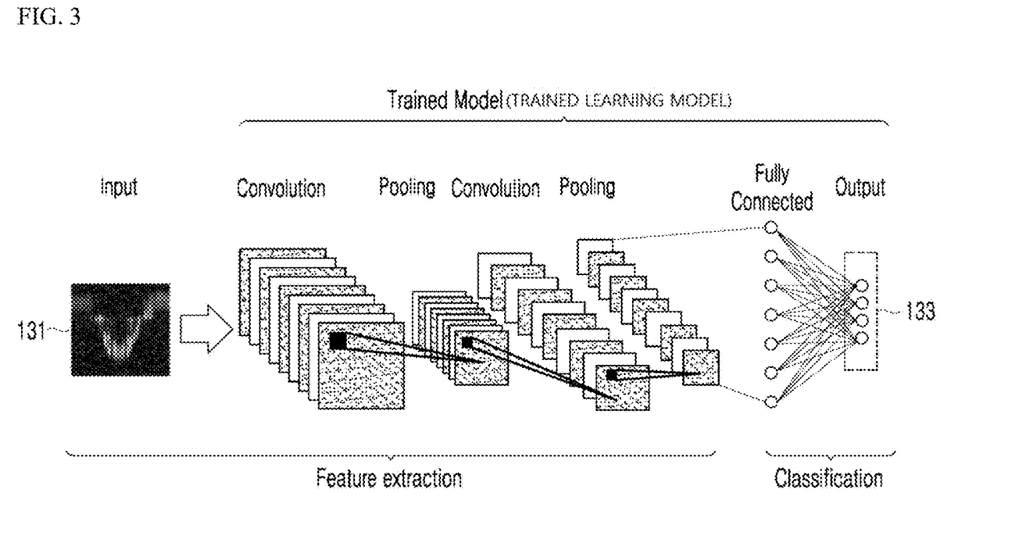
FIG. 3 is a diagram for describing motion recognition, to which a learning model based on machine learning is applied, according to an embodiment of the present disclosure.

A machine learning-based learning model capable of recognizing motion of a target according to an embodiment of the present disclosure will be described with reference to FIG. 3.

The machine learning-based learning model may include an artificial neural network having an architecture of CNN, R-CNN (Region based CNN), C-RNN (Convolutional Recursive Neural Network), Fast R-CNN, Faster R-CNN, R-FCN (Region based Fully Convolutional Network), YOLO (You Only Look Once), or SSD (Single Shot MultiBox Detector).

The artificial neural network may include a plurality of layers, and each of the layers may include a plurality of neurons. In addition, the artificial neural network may include a synapse connecting a neuron and a neuron.

In general, the artificial neural network may be defined by the following three factors, that is, (1) a connection pattern between neurons in different layers, (2) a learning process for updating a weight of connection, and (3) an activation function that generates an output value from a weighted sum of inputs received from a previous layer.

The learning model may be implemented as hardware, software, or a combination of hardware and software, and when part or all of the learning model is implemented as software, one or more instructions included in the learning model may be stored in the memory 130.

The learning model may receive a micro-range enhanced radar image 131, and determine motion in a final output layer 133 based on features extracted through a plurality of convolution layers and pooling layers. The final output layer may output a probability value that may be a plurality of motions.

The learning model of the motion recognition apparatus may be a learning model trained using training data obtained by labeling each of micro-range enhanced radar images generated from different motions as motion of the target for the corresponding image.

In this specification, when training data is input, an answer (or a result value) to be inferred by the artificial neural network is referred to as a label or labeling data.

Further, in this specification, setting a label on training data for training the artificial neural network is referred to as labeling.

A learning model for recognizing motion of the motion recognition apparatus may be trained in the motion recognition apparatus, or a learning model trained using training data in which each micro-range enhanced radar image is labeled as motion of the target for the corresponding image by a separate device may be received and used.

In an embodiment, the artificial neural network of the learning model for recognizing motion of the motion recognition apparatus may have an architecture specified by a model configuration, an activation function, a loss function or a cost function, a learning algorithm, an optimization algorithm, etc., and have content specified by a hyperparameter preset before training and a model parameter set through training of the motion recognition apparatus or a separate training device thereafter.

In another embodiment, the learning model for recognizing motion of the motion recognition apparatus may be a learning model obtained by retraining a first learning model pretrained based on a color image using training data in which each micro-range enhanced radar image is labeled as motion of the target for the corresponding image by the motion recognition apparatus or a separate device. In this case, the learning model is obtained by freezing parameters of the preset number of layers from input layers of the first learning model and training layers other than the layers, the parameters of which are frozen, using training data, and a ratio of the layers, the parameters of which are frozen, may be determined based on a type of the first learning model.

For example, when parameters of some layers are frozen, and the remaining layers are trained in a learning model such as Resnet18, Resnet101, or Inception Resnet V2 as a learning model having a parameter value (weight, bias, etc.) initialized to an arbitrary value by constructing a specific artificial neural network architecture and being trained using a color image as training data, a time required for training may be reduced while maintaining motion recognition accuracy.

In this instance, a training device that trains the learning model for recognizing motion may set the number of frozen layers according to a type of pretrained learning model.

In an embodiment, the learning model for recognizing motion may be a learning model in which all layers are retrained when Resenet 18 or Inception-Resnet-V2 is retrained, and may be a learning model in which layers, the number of which corresponds to 19.6% from an input layer, are frozen and the remaining layers are retrained when Resnet101 is retrained. This is based on experimental data below, which obtains accuracy while varying the number of frozen layers of each pretrained learning model based on micro-range enhanced radar.

TABLE 1

| | Relative position of frozen layer [%] | | | | |
|---|---|---|---|---|---|
| | 0.0 | 39.4 | 62.0 | 84.5 | 94.4 |
| Validation accuracy [%] | 1.0000 | 0.9933 | 0.9933 | 0.9667 | 0.9400 |
| Test accuracy [%] | 0.9840 | 0.9680 | 0.9640 | 0.9200 | 0.8880 |

TABLE 2

| | Relative position of frozen layer [%] | | | | | |
|---|---|---|---|---|---|---|
| | 0.0 | 19.6 | 40.4 | 60.5 | 80.7 | 98.8 |
| Validation accuracy [%] | 1.0000 | 0.9933 | 0.9867 | 0.9867 | 0.9800 | 0.9600 |
| Test accuracy [%] | 0.9800 | 0.9920 | 0.9800 | 0.9840 | 0.9760 | 0.9600 |

TABLE 3

| | Relative position of frozen layer [%] | | |
|---|---|---|---|
| | 0.0 | 34.6 | 64.8 |
| Validation accuracy [%] | 98.67 | 98.00 | 94.00 |
| Test accuracy [%] | 96.40 | 95.20 | 88.00 |

<Table 1> shows experimental data obtained by measuring accuracy of pretrained Resenet18 using a micro-range enhanced radar image while varying the number of frozen layers, <Table 2> shows experimental data obtained by measuring accuracy of pretrained Resnet101 using a micro-range enhanced radar image while varying the number of frozen layers, and <Table 3> shows experimental data obtained by measuring accuracy of pretrained Inception-Resnet-V2 using a micro-range enhanced radar image while varying the number of frozen layers.

Figure 4:
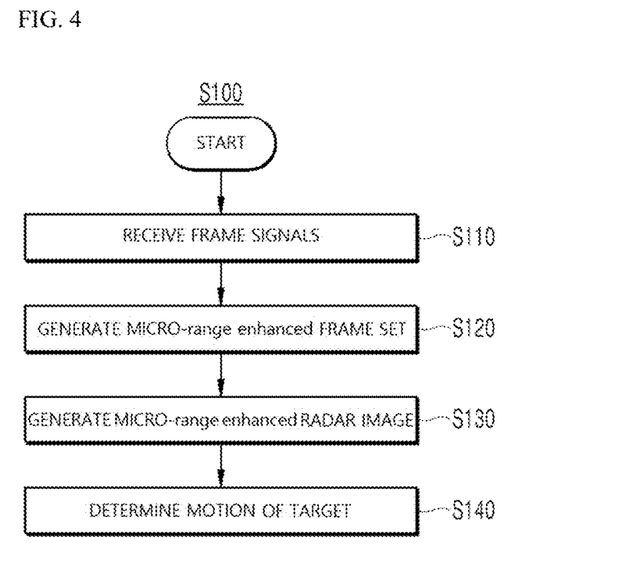
FIG. 4 is a flowchart for describing the motion recognition method according to an embodiment of the present disclosure.

A motion recognition method of the motion recognition apparatus according to an embodiment of the present disclosure will be described with reference to FIG. 4.

The motion recognition apparatus may receive a plurality of frame signals based on radar pulses reflected from the target at different times (S110).

A frame signal is the signal 610 obtained by dividing, at a regular time interval, a reflected signal of a pulse radar signal transmitted at a regular time interval. A Y-axis of the frame signal may be an amplitude value indicating signal strength, and an X-axis may be an index value related to a distance to the target. In this specification, a signal, an amplitude value of which is determined according to each index from an envelope curve 620 tangent to each highest amplitude value according to the index of the frame signal, is referred to as an envelope frame signal. That is, an envelope frame set may be configured by extracting an envelope of pulse peaks of the frame signal. In addition, a stack of respective frame signals or envelope frame signals formed at preset time intervals is referred to as a frame set or an envelope frame set.

Figure 7:
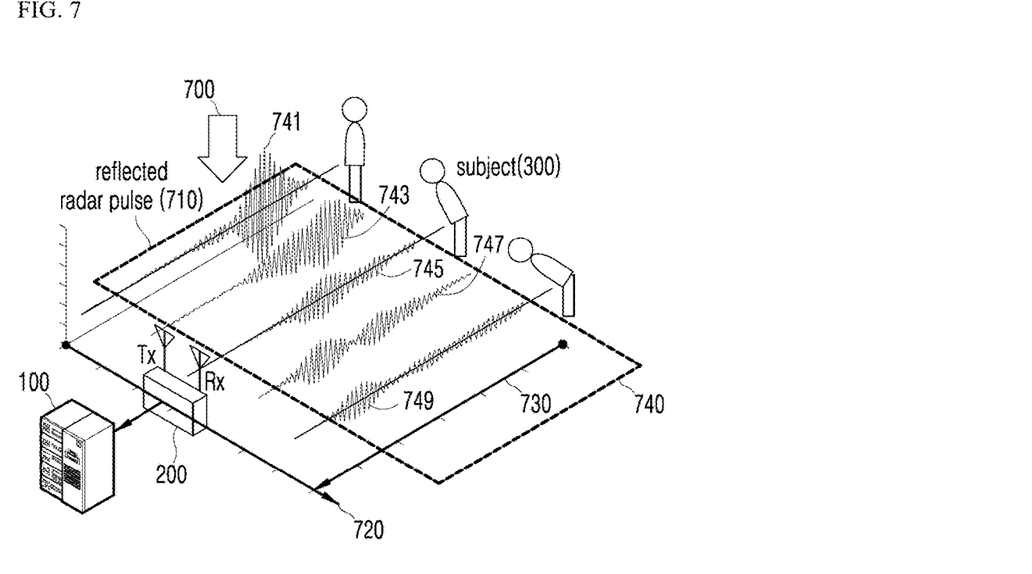
FIG. 7 is a diagram for describing a radar signal, an ensemble mean, and a micro-range enhanced radar image according to an embodiment of the present disclosure.

For example, referring to FIG. 7, a frame set may be generated from a plurality of frame signals 741, 743, 745, 747, and 749 based on radar signals reflected from the target 300 by setting a time axis 720 as a horizontal axis and an index axis 730 as a vertical axis.

The motion recognition apparatus may determine a high-motion region among a plurality of frame signals, generate a micro-range enhanced frame signal by enhancing the high-motion region, and stack micro-range enhanced frame signals at preset time intervals to generate a micro-range enhanced frame set (S120).

For example, referring to FIG. 7, the frame signals 741, 743, 745, 747, and 749 of radar signals reflected by components of the target 300 and received by the radar device 200 according to movement of the target 300 may have changing amplitude values on the same index axis 730 at different times as distances between the components of the target 300 and the radar device 200 change.

Figure 8:
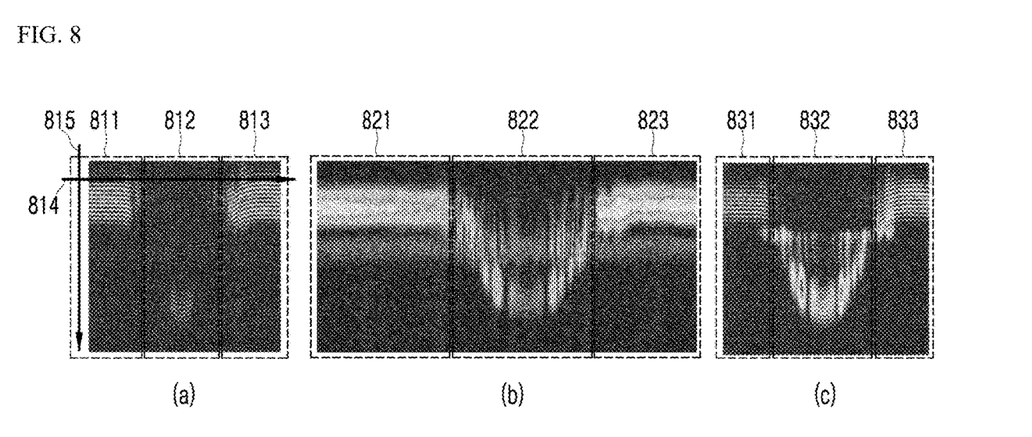
FIG. 8 is a flowchart illustrating a method of generating a micro-range enhanced frame set according to an embodiment of the present disclosure.
Figure 9:
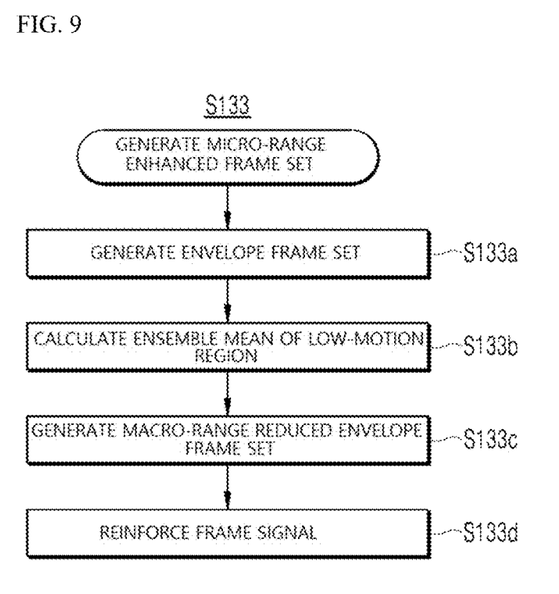
FIG. 9 is a flowchart illustrating a method of generating a micro-range enhanced frame set according to an embodiment of the present disclosure.

Referring to FIG. 8, FIG. 8(a) illustrates a radar image of a frame set obtained by viewing a frame set 740 in which the plurality of frame signals 741, 743, 745, 747, and 749 is stacked at preset time intervals in a direction 700 perpendicular to the time axis 720 and mapping the frame set 740 to a color value based on amplitude of the frame signals.

For example, a second region 812 is a region in which the area of a component of the target 300, for example, the reflection area of the component of the target 300 is small according to movement of the target 300 when compared to first regions 811 and 813 of a frame radar image, and it can be seen that, when the target 300 is a human, a pulse radar signal is reflected from movement of at least one of a head, an arm, or a leg, the distance between the target 300 and the radar device 200 changes, and thus there are a lot of changes at points having different values on a time axis 814 and the same value on an index axis 815. In this case, the motion recognition apparatus may enhance a component of the high-motion region (micro-range 812) to generate a micro-range enhanced frame signal as illustrated in FIG. 8(c).

Figure 5:
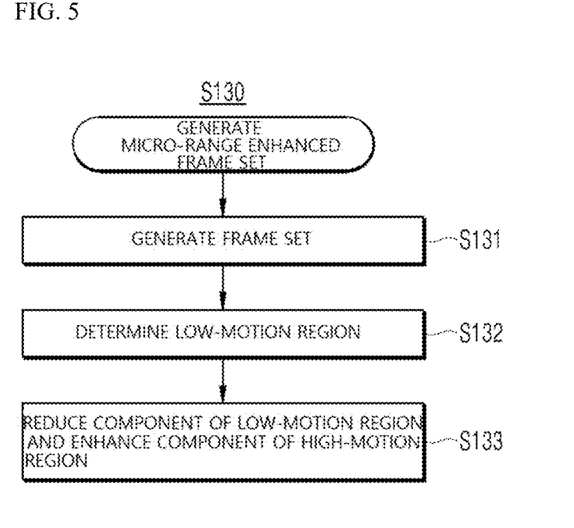
FIG. 5 is a diagram for describing a frame signal and an envelope of the frame signal according to an embodiment of the present disclosure.

A method of generating a micro-range enhanced frame set by the motion recognition apparatus will be described in detail with reference to FIG. 5.

In an embodiment, the motion recognition apparatus may generate the frame set 740 by stacking the plurality of frame signals 741, 743, 745, 747, and 749 based on radar signals received at different times along the time axis 720 at preset time intervals (S131).

In an embodiment, the motion recognition apparatus may determine a low-motion region in the frame set 740 (S132).

For example, referring to FIG. 8 (For convenience, FIG. 8 is described as a frame radar image of FIG. 8(*a*) and an ensemble mean radar image of FIG. 8(*b*). However, it should be noted that a person skilled in the art may perform processing for each frame signal rather than an image.), changes of the same points of the plurality of frame signals 741, 743, 745, 747, and 749 on the index axis 814 may be scanned to determine a region 812 having large changes (high motion) and regions 811 and 813 having small changes (low motion). In this instance, while scanning changes of the same points on the index axis 815 at which the target is determined to be located, or changing values on the time axis 814 (that is, along the time axis 814), changes of amplitude values of the plurality of frame signals 741, 743, 745, 747, and 749 may be scanned. A correlation coefficient of adjacent frame signals may be calculated, or a region 812 including frame signals corresponding to a time domain in which changes of the same points of the plurality of frame signals 741, 743, 745, 747, and 749 on the index axis 814 are greater than or equal to a preset reference value may be determined as a region having a large change (high motion), and the other region may be determined as a region having a small change (low motion). In addition, it is obvious to a person skilled in the art that a region having a large change (high motion) may be determined using various statistical or arithmetic methods.

In the frame set 740, the motion recognition apparatus may reduce a component of a low-motion region and enhance a component of a high-motion region (S133).

In an embodiment, the motion recognition apparatus may determine frame signals included in a low-motion region, and reduce a statistical average contribution of the corresponding frame signals from the entire frame set.

For example, referring to FIG. 8(*b*), an envelope frame signal generated from each envelope of frame signals may be determined, and respective envelope frame signals may be stacked on a time axis to generate an envelope frame set (S133*a*). In an embodiment, the motion recognition apparatus may generate an envelope frame signal targeting only components having positive values of the frame signal. An envelope frame image obtained by viewing an envelope frame set in the direction perpendicular to the time axis and mapping the envelope frame set to a color value based on amplitude values of envelope frame signals may be as illustrated in FIG. 8(*b*).

Thereafter, the motion recognition apparatus may calculate an ensemble mean of envelope frame signals related to regions 821 and 823 having small changes (low motion) (S133*b*), and subtract the ensemble mean from each of the plurality of envelope frame signals included in the envelope frame set to generate a macro-range reduced envelope frame set formed of a plurality of macro-range reduced frame signals in which a component of a low-motion region is reduced (S133*c*). The motion recognition apparatus may reinforce the frame signal by adding the macro-range reduced frame signals to the frame signal (S133*d*). For example, positive components of the plurality of macro-range reduced frame signals may be added to positive components of a plurality of frame signals from which negative values are eliminated to generate a plurality of micro-range enhanced frame signals, and the plurality of micro-range enhanced frame signals may be stacked along the time axis to generate a micro-range enhanced frame set. FIG. 8(*c*) illustrates a result of viewing the micro-range enhanced frame set in the direction perpendicular to the time axis, and mapping the micro-range enhanced frame set to a color value based on amplitude values of envelope micro-range enhanced signals. It can be seen that a component of a high-motion region 832 is reinforced (contribution of a frame signal of the high-motion region 832 is reinforced), and components of low-motion regions 831 and 838 are reduced when compared to the frame set of FIG. 8(*a*).

In an embodiment, it is possible to use a result of processing data of an envelope frame signal and a frame signal in a direction of the time axis using a low-pass filter (LPF) for passing a component of less than 10 Hz, which may remove high-frequency noise due to discontinuity between respective data values on the time axis.

As described above, in an embodiment, since the envelope frame signal and the frame signals are bipolar signals having both positive and negative amplitude values, and positive and negative parts are symmetrical, only positive values may be selectively used. Due to symmetry, information loss does not occur even when only positive values are used, and when imaging several frame sets such as frame sets and micro-range enhanced frame sets, there is an effect of expressing the entire region using half data rather than using the whole data.

The motion recognition apparatus may generate a micro-range enhanced radar image by viewing the micro-range enhanced frame set in the direction perpendicular to the time axis (S130).

In an embodiment, the motion recognition apparatus may normalize an amplitude value of a micro-range enhanced frame signal included in a micro-range enhanced frame to a preset range, and map the normalized amplitude value based on a preset color map, thereby generating a colorized micro-range enhanced radar image. Therefore, even when retraining a learning model pre-trained using a color image, a micro-range enhanced radar image may be used as a suitable input image, and contrast information may be used for each pixel when compared to a grayscale image, improving motion recognition accuracy of the learning model.

The motion recognition apparatus may determine motion of the target by inputting a micro-range enhanced radar image to a learning model trained using training data in which micro-range enhanced radar images generated from different motions are labeled with the corresponding motions, respectively (S140). The learning model has been described in detail above, and thus other descriptions are omitted.

In the motion recognition method of the motion recognition apparatus according to the embodiment of the present disclosure described with reference to FIGS. 4 to 9, when data in an earlier step is not used in a subsequent step, it is obvious to a person skilled in the art that respective steps may be implemented by mutually changing the order.

A motion recognition method of the motion recognition apparatus according to another embodiment of the present disclosure will be described with reference to FIGS. 10 to 13.

Figure 10:
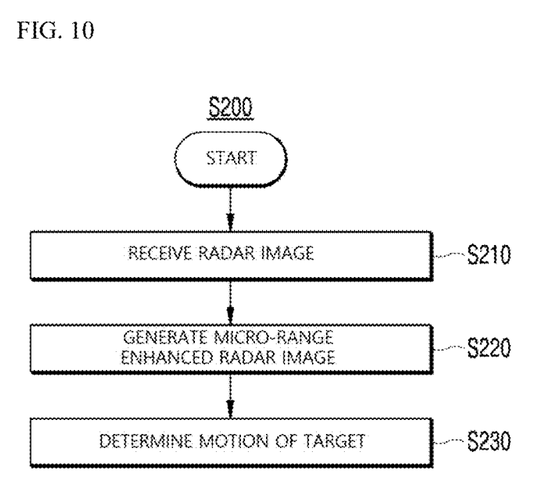
FIG. 10 is a flowchart illustrating a motion recognition method according to another embodiment of the present disclosure.

The motion recognition apparatus may receive radar frame signals from a separate device, stack the radar frame signals at preset time intervals to generate a frame set, and view the frame set in the direction perpendicular to the time axis to generate a radar image, or receive input of a radar image obtained by viewing a frame set in the direction perpendicular to the time axis from a separate device (S210).

The radar image may be a two-dimensional image in which pixel values are mapped based on the amplitude of the frame signals. In an embodiment, a pixel value may be a value mapped to a color value based on the amplitude of envelopes having an envelope central value of the frame signals.

That is, unlike the above-described embodiment, the motion recognition apparatus may reinforce components of a micro-range in which motion of the target is high, and reduce components of a macro-range in which motion of the target is low based on an image.

The motion recognition apparatus may determine a micro-range within which a change in distance between the target and the radar device is reflected by reflection of a pulse radar signal due to movement of a part of the target, which is a component of the target in the case of a person, that is, at least one of a head, an arm, or a leg in a radar image, and generate a micro-range enhanced radar image obtained by reinforcing components of a micro-range in the radar image (S220).

Figure 11:
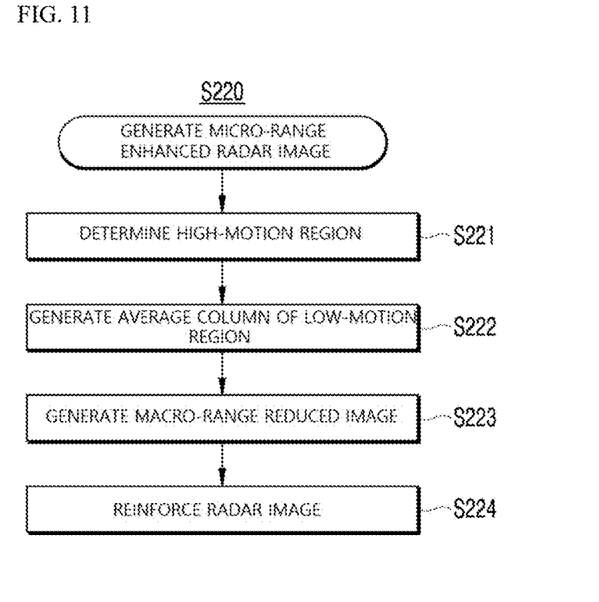
FIG. 11 is a flowchart for describing a method of generating the micro-range enhanced radar image according to an embodiment of the present disclosure.

A method of generating a micro-range enhanced radar image will be described in detail with reference to FIGS. 11 to 13.

Figure 12:
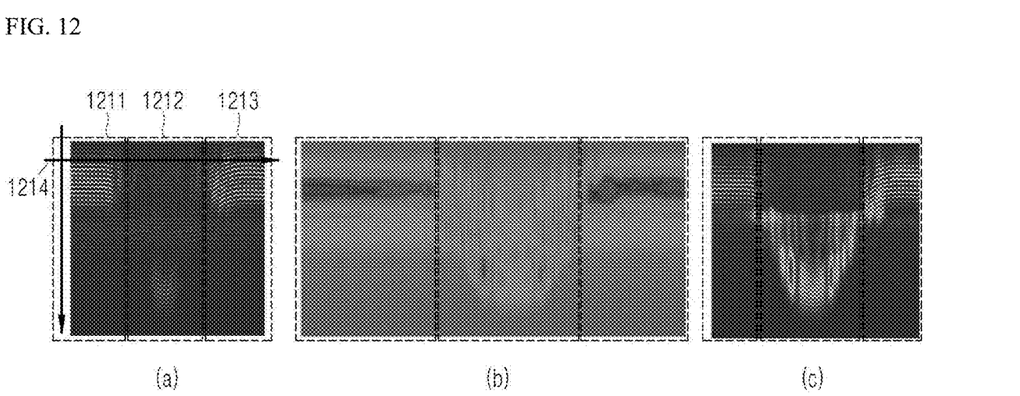
FIG. 12 is a diagram for describing a radar image and a micro-range enhanced radar image based on a radar image according to an embodiment of the present disclosure.

The motion recognition apparatus may determine a micro-range in which motion (movement) of the target is high in the radar image as illustrated in FIG. 12(a) (S221).

In an embodiment, by scanning changes in pixel values of the same row of the radar image of FIG. 12(a), it is possible to determine a region 1212 having a large change (high motion) and regions 1211 and 1213 having small changes (low motion). In this instance, it is possible to scan a change in pixel value of a row 1214 in which the target is determined to be located, or scan changes in pixel values of a plurality of columns while changing the row 1214.

Figure 13:
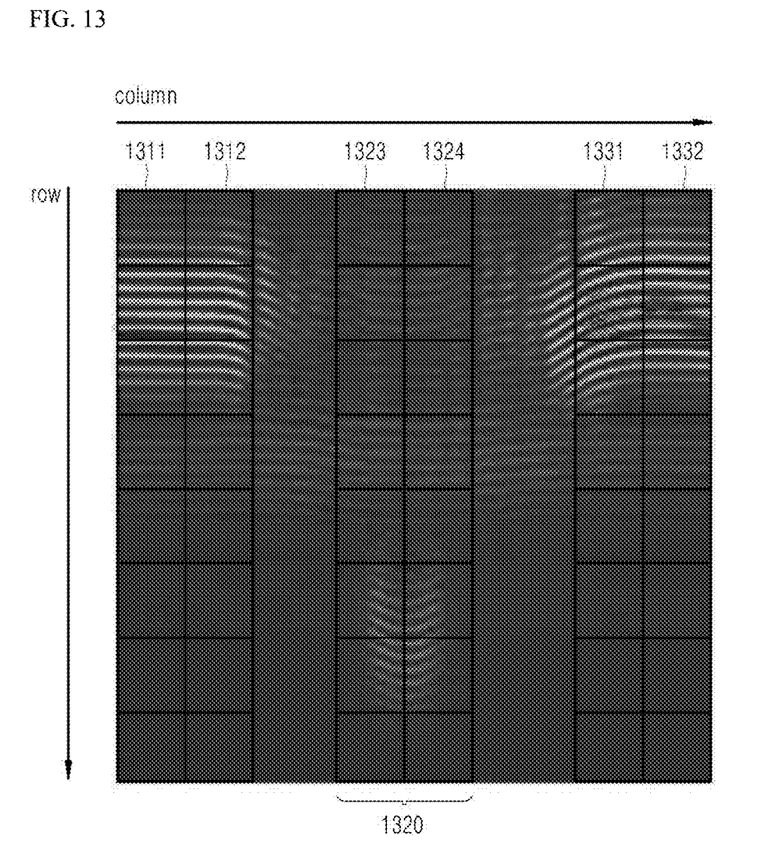
FIG. 13 is a diagram for describing a macro-range, a micro-range, and an average column based on a radar image according to an embodiment of the present disclosure.

Referring to FIG. 13, in an embodiment, a correlation coefficient may be calculated based on pixel values of adjacent columns (for example, 1311 and 1312, 1323 and 1324, and 1331 and 1332), or a region 1320 including columns in which changes in pixel values in the same row of each of the columns 1311 to 1332 are greater than or a preset reference value may be determined as a micro-range having a large change (high motion), and the other region may be determined as a macro-range having a small change (low motion). In addition, it is obvious to a person skilled in the art that a region having large changes (high motion) may be determined using various statistical or arithmetic methods.

The motion recognition apparatus may generate an average column by statistically or arithmetically averaging pixel values of the same row for a plurality of columns of a macro-range in which changes of pixel values are small between columns (that is, the target moves less) (S222), and statistically or arithmetically subtract a pixel value of an average column from a pixel value of each column of a radar image to generate a macro-range reduced image (S223). Thereafter, a micro-range enhanced radar image may be generated by statistically or arithmetically reinforcing the generated macro-range reduced image in the radar image (S224).

The motion recognition apparatus may determine motion of the target by inputting the micro-range enhanced radar image to a learning model trained using training data in which micro-range enhanced radar images generated from different motions are labeled with the corresponding motions, respectively (S230).

A method of determining a micro-range of the motion recognition apparatus according to another embodiment of the present disclosure will be described with reference to FIGS. 14 and 15.

Figure 14:
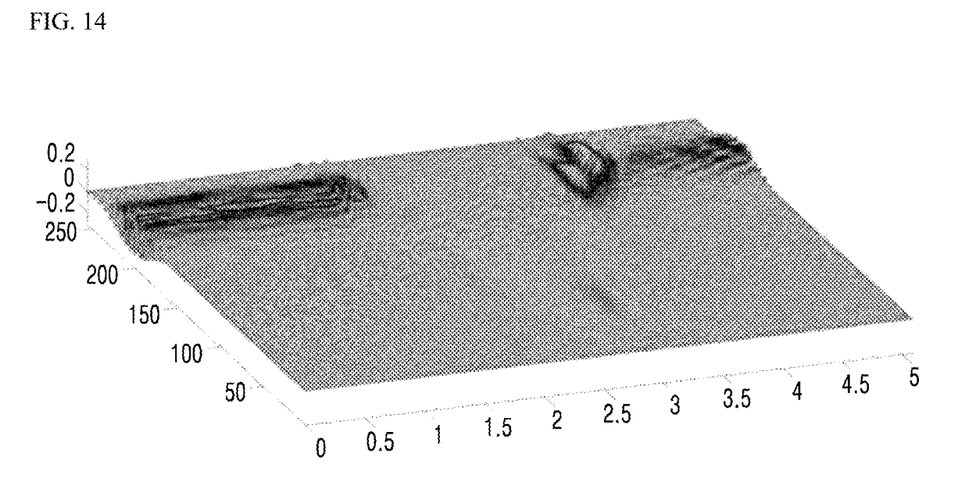
FIG. 14, FIG. 15, and FIG. 16 are an example for describing a micro-range of the motion recognition apparatus according to another embodiment of the present disclosure.
Figure 15:
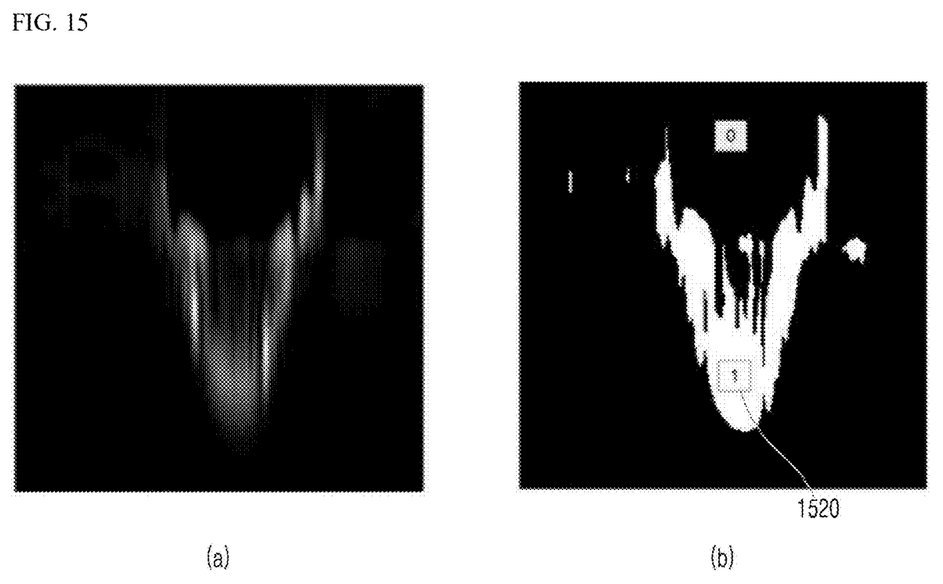

In an embodiment, the motion recognition apparatus may generate a radar image as illustrated in FIG. 15(a) in which the envelope frame set generated from the frame set as illustrated in FIG. 14 is viewed in the direction perpendicular to the time axis. The radar image may be a grayscale image obtained by mapping an amplitude value of an envelope frame signal to a gray level. After converting the radar image into a binary image, the motion recognition apparatus may remove a small white region by performing erosion (dilation) processing or similar processing during morphology operation (FIG. 15(b)). The motion recognition apparatus 100 may determine a white region 1520 having a predetermined size or more in an eroded binary image as a high-motion micro-range.

Figure 16:
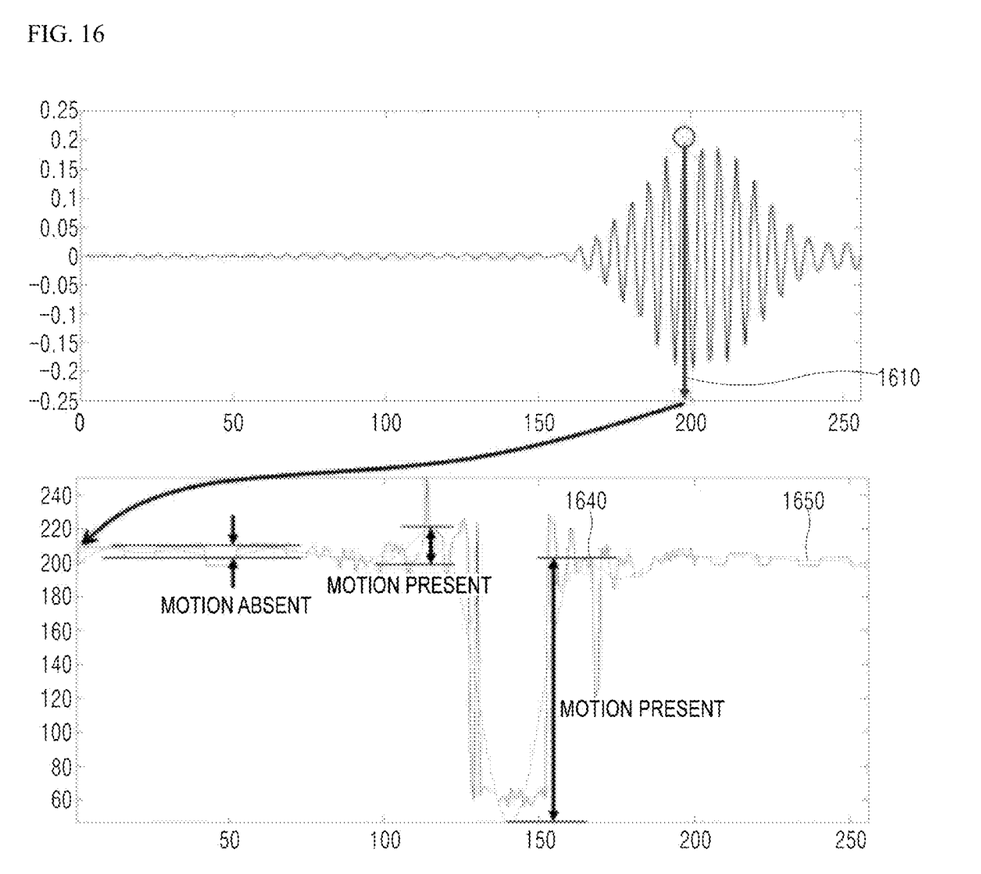

A method of determining a micro-range of the motion recognition apparatus according to another embodiment of the present disclosure will be described with reference to FIGS. 14 and 16.

In an embodiment, the motion recognition apparatus may search for a maximum amplitude index number 1610 having the largest amplitude value in each frame signal of the envelope frame set generated from the frame set as illustrated in FIG. 14. The motion recognition apparatus may monitor changes in maximum amplitude index numbers of all frame signals (for example, changes in amplitude of numbers), and determine part 1640, changes of which exceed a preset range, as micro-ranges having a lot of movement. In this instance, the motion recognition apparatus may perform low-pass filtering (1650) on a flow of the maximum amplitude index number, and then monitor the change in the number.

The method of determining the micro-range of the motion recognition apparatus described with reference to FIGS. 14 to 16 may be used when the motion recognition apparatus reinforces components of the region in which motion of the target is high (micro-range) based on the frame signal or the radar image generated based on the frame signal and reduces components of the region in which motion of the target is low (macro-range). Further, other methods may be used to determine the region in which motion of the target is high (micro-range) and the region in which motion of the target is low (macro-range) based on the frame signal or the radar image.

The present disclosure described above may be implemented as computer-readable code in a medium on which a program is recorded. A computer-readable medium includes all types of recording devices in which data readable by a computer system is stored. Examples of computer-readable medium include a hard disk drive (HDD), a solid state drive (SSD), a silicon disk drive (SDD), a ROM, a RAM, a CD-ROM, a magnetic tape, a floppy disk, an optical data storage device, etc. In addition, the computer may include the processor of the motion recognition apparatus.

Meanwhile, the program may be specially designed and configured for the present disclosure, or may be known and available to a person skilled in the art in the field of computer software. Examples of programs may include not only machine language code generated by a compiler but also high-level language code executable by a computer using an interpreter, etc.

In the specification of the present disclosure (especially in the claims), the use of the term "the" and similar denoting terms may correspond to both singular and plural. In addition, when a range is described in the present disclosure, an invention to which an individual value included in the range is applied is included (unless stated otherwise), which is equivalent to describing each individual value included in the range in the detailed description of the invention.

Unless an order is explicitly stated or stated to the contrary for steps included in the method according to the present disclosure, the steps may be performed in any suitable order. The present disclosure is not necessarily limited to the described order of the steps. All examples or exemplary terms (for example, etc.) in this disclosure are simply used to describe the present disclosure in detail, and the scope of the present disclosure is limited due to the examples or exemplary terms unless limited by the claims. In addition, a person skilled in the art may appreciate that various modifications, combinations and changes may be made according to design conditions and factors within the scope of the appended claims or equivalents thereto.

Therefore, the spirit of the present disclosure should not be limited to the above-described embodiments, and it should be understood that not only the following claims, but also all ranges equivalent to or equivalently modified from these claims belong to the scope of the spirit of the present disclosure.

This invention is supported by the National Research and Development Project described below.

[Assignment identification number] 2020010121
[Name of Government Department] Ministry of Science and ICT
[Research project name] Development of intelligent positioning system based on sensor fusion
[Research project title] Development of intelligent positioning system based on sensor fusion
[Organizer] Daegu Gyeongbuk Institute of Science and Technology
[Research period] Jan. 1, 2020 to Dec. 31, 2020

The invention claimed is:

1. A method of operating a motion recognition apparatus, the method comprising:
    receiving a plurality of frame signals based on radar pulses reflected from a target at different times;
    generating, by a processor, a plurality of micro-range enhanced frame signals obtained by reinforcing a component of a second region having more movement than movement of a first region among the plurality of frame signals, and generating a micro-range enhanced frame set formed by stacking, along a time axis, the plurality of micro-range enhanced frame signals at preset time intervals;
    generating, by the processor, a micro-range enhanced radar image which is an image obtained by viewing the micro-range enhanced frame set in a direction perpendicular to the time axis and an index axis of the micro-range enhanced frame set, the index axis being an axis related to a distance to the target; and
    determining, by the processor, motion of the target by inputting the micro-range enhanced radar image to a machine learning-based learning model.

2. The method according to claim 1, wherein the second region is a region including at least some of the radar pulses reflected from a region having a small reflection area among components of the target.

3. The method according to claim 2, wherein the target is a human body, and the second region is a region including at least some of the radar pulses reflected from movement of at least one of a head, an arm, or a leg of the target.

4. The method according to claim 1, wherein the micro-range enhanced radar image is a two-dimensional image having the time axis related to a reflection time from the target and the index axis as image axes, and having a pixel value related to amplitude of the micro-range enhanced frame signals.

5. The method according to claim 4, wherein the pixel value of the micro-range enhanced radar image is a value mapped to a color value based on the amplitude of the micro-range enhanced frame signals.

6. The method according to claim 1, wherein the learning model is a learning model trained using training data in which each of micro-range enhanced radar images generated from different motions is labeled as the motion.

7. The method according to claim 6, wherein the learning model is a learning model obtained by retraining a pre-trained first learning model using the training data based on a color image.

8. The method according to claim 7, wherein the learning model is a learning model obtained by freezing parameters of a preset number of layers from input layers of the first learning model and training layers other than the layers, the parameters of which are frozen, using the training data, and a ratio of the layers, the parameters of which are frozen, is determined based on a type of the first learning model.

9. The method according to claim 1, wherein the generating of the micro-range enhanced frame signals comprises:
    generating, by the processor, a frame set formed by stacking the plurality of frame signals at preset time intervals;
    determining, by the processor, a plurality of first frame signals highly related to the first region having less movement than movement of the second region among the plurality of frame signals; and
    reducing, by the controller, a contribution of the plurality of first frame signals and reinforcing a contribution of a plurality of second frame signals included in the second region in the frame set.

10. The method according to claim 9, wherein the reducing a contribution of the plurality of first frame signals and reinforcing a contribution of a plurality of second frame signals in the frame set comprises:
    generating, by the processor, an envelope frame set formed of a plurality of envelope frame signals which are envelopes of the plurality of frame signals of the frame set;
    calculating, by the processor, an ensemble mean for envelopes of the plurality of first frame signals;
    generating, by the processor, a macro-range reduced envelope frame set formed of a plurality of macro-range reduced frame signals obtained by subtracting the ensemble mean from the plurality of envelope frame signals included in the envelope frame set; and
    reinforcing, by the processor, the plurality of frame signals included in the frame set based on components of the plurality of macro-range reduced frame signals.

11. The method according to claim 10, wherein the reinforcing the plurality of frame signals comprises generating, by the processor, the micro-range enhanced frame set including the plurality of macro-range reduced frame signals by adding positive components of the plurality of macro-range reduced frame signals to positive components of the plurality of frame signals included in the frame set.

12. The method according to claim 11, wherein the generating the micro-range enhanced radar image comprises normalizing, by the processor, amplitude values of the plurality of micro-range enhanced frame signals to a preset range, and mapping the normalized amplitude values based on a preset color map.

13. A motion recognition apparatus comprising:
at least one processor; and
a memory electrically connected to the processor and configured to store at least one piece of code executed by the processor,
wherein the memory stores code that causes the processor to:
receive a plurality of frame signals based on radar pulses reflected from a target at different times,
generate a plurality of micro-range enhanced frame signals obtained by reinforcing a component of a second region having more movement than movement of a first region among the plurality of frame signals,
generate a micro-range enhanced frame set formed by stacking, along a time axis, the plurality of micro-range enhanced frame signals at preset time intervals,
generate a micro-range enhanced radar image which is an image obtained by viewing the micro-range enhanced frame set in a direction perpendicular to the time axis and an index axis of the micro-range enhanced frame set, the index axis being an axis related to a distance to the target, and
determine motion of the target by inputting the micro-range enhanced radar image to a machine learning-based learning model when executed through the processor.

14. The motion recognition apparatus according to claim 13, wherein the micro-range enhanced radar image is a two-dimensional image having the time axis related to a reflection time from the target and the index axis as image axes, and having a pixel value related to amplitude of the micro-range enhanced frame signals.

15. The motion recognition apparatus according to claim 13, wherein the learning model is a learning model trained using training data in which each of micro-range enhanced radar images generated from different motions is labeled as the motion.

16. A motion recognition apparatus comprising:
at least one processor; and
a memory electrically connected to the processor and configured to store at least one piece of code executed by the processor,
wherein the memory stores code that causes the processor to:
receive input of a radar image which is an image obtained by viewing a micro-range enhanced frame set in a direction perpendicular to a time axis and an index axis of the micro-range enhanced frame set, the index axis being an axis related to a distance to the target, and the micro-range enhanced frame set being formed by stacking, at preset time intervals, a plurality of frame signals along the time axis, based on radar pulses reflected from a target at different times,
determine a micro-range within which a change in distance between at least a part of the target and a reception antenna is reflected due to movement of the part in the radar image,
generate a micro-range enhanced radar image obtained by reinforcing components of the micro-range, and
determine motion of the target by inputting the micro-range enhanced radar image to a machine learning-based learning model when executed through the processor.

17. The motion recognition apparatus according to claim 16, wherein the radar image is a two-dimensional image having pixel values based on amplitude of the frame signals.

18. The motion recognition apparatus according to claim 16, wherein a pixel value of the radar image is a value mapped to a color value based on amplitude of envelopes of the frame signals.

19. The motion recognition apparatus according to claim 16, wherein the memory further stores code that causes the processor to determine a second region in which a change in a pixel value between columns is larger than a change in a pixel value between columns in a first region in the radar image, generate an average column formed of an average of pixel values of the same row of a plurality of columns not including the second region, generate a macro-range reduced image by subtracting a pixel value of the average column from a pixel value of the radar image, and generate the micro-range enhanced radar image by reinforcing the macro-range reduced image to the radar image when executed through the processor.

* * * * *